US012730217B2

(12) United States Patent
Beda et al.

(10) Patent No.: US 12,730,217 B2
(45) Date of Patent: Sep. 8, 2026

(54) LANDING NAVIGATION BASED ON RADAR ALTIMETER AND MULTI-ECHOES RF BEACONS

(71) Applicant: Honeywell International Inc., Charlotte, NC (US)

(72) Inventors: Tomas Beda, Prague (CZ); Jan Reznicek, Prague (CZ); Petr Kejik, Brno (CZ); Jan Lukas, Brno (CZ); Vibhor L. Bageshwar, Rosemount, MN (US); Pavel Ptacek, Rosice (CZ)

(73) Assignee: Honeywell International Inc., Charlotte, NC (US)

( * ) Notice: Subject to any disclaimer, the term of this patent is extended or adjusted under 35 U.S.C. 154(b) by 344 days.

(21) Appl. No.: 18/493,486

(22) Filed: Oct. 24, 2023

(65) Prior Publication Data

US 2025/0004127 A1 Jan. 2, 2025

Related U.S. Application Data

(60) Provisional application No. 63/510,973, filed on Jun. 29, 2023.

(51) Int. Cl.
*G01S 13/91* (2006.01)
*G01S 13/87* (2006.01)

(52) U.S. Cl.
CPC .......... *G01S 13/913* (2013.01); *G01S 13/872* (2013.01); *G01S 13/876* (2013.01)

(58) Field of Classification Search
CPC .... G01S 13/913; G01S 13/872; G01S 13/876; G01S 13/934; G01S 13/935; G01S 13/882; G01S 13/933; G01S 7/41
See application file for complete search history.

(56) References Cited

U.S. PATENT DOCUMENTS 4,314,249 A 2/1982 Onoe
4,429,312 A 1/1984 Chisholm
(Continued)

FOREIGN PATENT DOCUMENTS

CA 2050059 C 2/2001
DE 102014211522 A1 12/2015
(Continued)

OTHER PUBLICATIONS

User Manual: Sailor Sart II 9GHz Search and Rescue Transponder. Sailor. https://norman-marine.ru/documents/SAILOR%20SART%2011%20User%20manual.pdf. (Year: 2019).*
(Continued)

*Primary Examiner* — Vladimir Magloire
*Assistant Examiner* — Anna K. Gosling
(74) *Attorney, Agent, or Firm* — Fogg & Powers LLC

(57) ABSTRACT

A method includes providing a radar sensor onboard a vehicle, and one or more active radar beacons around a landing site. Each beacon produces a pattern of one or more artificial echoes that is different from a pattern of echoes produced by others of the beacons. The method further includes guiding the vehicle toward the landing site by transmitting radar signals from the radar sensor to an area around the landing site; receiving return signals from the area around the landing site, including ground reflected signals and transmitted signals from each beacon; and determining whether artificial echoes are detected in the received return signals. When artificial echoes are detected, beacon parameters are loaded from an onboard active beacons database; patterns in the artificial echoes are identified and associated with corresponding beacons from the database; and a slant range to each of the beacons is estimated through the patterns.

20 Claims, 9 Drawing Sheets

(56) References Cited

U.S. PATENT DOCUMENTS

| | | | | |
|---|---|---|---|---|
| 4,866,450 | A | 9/1989 | Chisholm | |
| 5,047,779 | A | 9/1991 | Hager | |
| 5,218,360 | A * | 6/1993 | Goetz | G01S 3/28 342/407 |
| 5,680,136 | A | 10/1997 | Chekroun | |
| 5,751,238 | A | 5/1998 | Lin | |
| 6,204,805 | B1 | 3/2001 | Hager | |
| 6,980,153 | B2 | 12/2005 | Hager et al. | |
| 6,989,783 | B1 | 1/2006 | Matich et al. | |
| 7,239,266 | B2 | 7/2007 | Vacanti | |
| 8,788,128 | B1 | 7/2014 | McCusker | |
| 8,866,667 | B2 | 10/2014 | Vacanti | |
| 10,539,674 | B2 | 1/2020 | Frick et al. | |
| 2002/0034958 | A1 | 3/2002 | Oberschmidt et al. | |
| 2009/0055038 | A1 | 2/2009 | Garrec et al. | |
| 2012/0044104 | A1 * | 2/2012 | Schloetzer | G01S 13/878 342/357.29 |
| 2015/0029050 | A1 | 1/2015 | Driscoll et al. | |
| 2019/0064341 | A1 * | 2/2019 | Bunch | G01S 13/86 |
| 2022/0018954 | A1 | 1/2022 | Santucci et al. | |

FOREIGN PATENT DOCUMENTS

| | | | | |
|---|---|---|---|---|
| EP | 1963942 | B1 | 2/2010 | |
| EP | 2420856 | A1 | 2/2012 | |
| EP | 3208633 | A1 | 8/2017 | |
| FR | 2878336 | A1 | 5/2006 | |
| GB | 2219175 | A * | 11/1989 | G01S 13/767 |
| WO | 2020070529 | A1 | 4/2020 | |

OTHER PUBLICATIONS

Datrex, "Active X Radar Reflector—X Band with LED", as downloaded Jul. 27, 2023 from https://www.datrex.com/product/active-x-radar-reflector-x-band-with-led/, pp. 1 through 4.

Dobrev et al., "Radar-Based High-Accuracy 3D Localization of UAVs for Landing in GNSS-Denied Environments", 2018 IEEE MTT-S International Conference on Microwaves for Intelligent Mobility (ICMIM), as downloaded Aug. 7, 2023 from IEEE Xplore, pp. 1 through 4.

Gisinger et al., "First Experiences with Active C-Band Radar Reflectors and Sentinel-1" 2020 IEEE International Geoscience and Remote Sensing Symposium, as downloaded Aug. 8, 2023 from IEEE Xplore, pp. 1165 through 1168.

Luzi et al., "A Low-Cost Active Reflector for Interferometric Monitoring Based on Sentinel-1 SAR Images", Sensors 2021, 21, 2008, Mar. 12, 2021, pp. 1 through 20.

Mu et al., "A Distributed Radio Beacon/IMU/Altimeter Integrated Localization Scheme with Uncertain Initial Beacon Locations for Lunar Pinpoint Landing", Sensors, 2020, 20, 5637, Oct. 2, 2020, pp. 1 through 19.

Osipchuk, "Prototype Radio Multiposition Navigation and Landing Systems", 2015 IEEE 3rd International conference Actual Problems of Unmanned Aerial Vehicles Developments (APUAVD) Proceedings, as downloaded Aug. 7, 2023 from IEEE Xplore, pp. 257 through 260.

Pavlenko et al., "Wireless Local Positioning System for Controlled UAV Landing in GNSS-Denied Environment", as downloaded Aug. 7, 2023 from IEEE Xplore, pp. 171 through 175.

Ptacek et al., "Smart Radar Altimeter Beam Control and Processing Using Surface Database", U.S. Appl. No. 18/049,155, filed Oct. 24, 2022. pp. 1 through 29, Published: US.

Tualcom, "5-18 GHz Active Radar Reflector", as downloaded Aug. 8, 2023 from https://www.tualcom.com/uploads/docs/products/1638545106_active-radar-reflector.pdf. pp. 1 through 4.

Vossiek et al., "Precise 3-D Object Position Tracking Using FMCW Radar", 29the European Microwave Conference, Munich 1999, as downloaded Aug. 7, 2023 from IEEE Xplore, pp. 234 through 237.

European Patent Office, "Extended European Search Report", dated Nov. 25, 2024, from U.S. Appl. No. 18/493,486, from Foreign Counterpart to U.S. Appl. No. 18/493,486, pp. 1 through 10, Published: EP.

* cited by examiner 200
202
r2
RA2
r3
Δr2-AP1
h
RA2-AP1
r1
RA3
Δr3-AP1
RA1
Δr3-AP1
Δr1-AP1
RA3-AP1
210
RA1-AP1

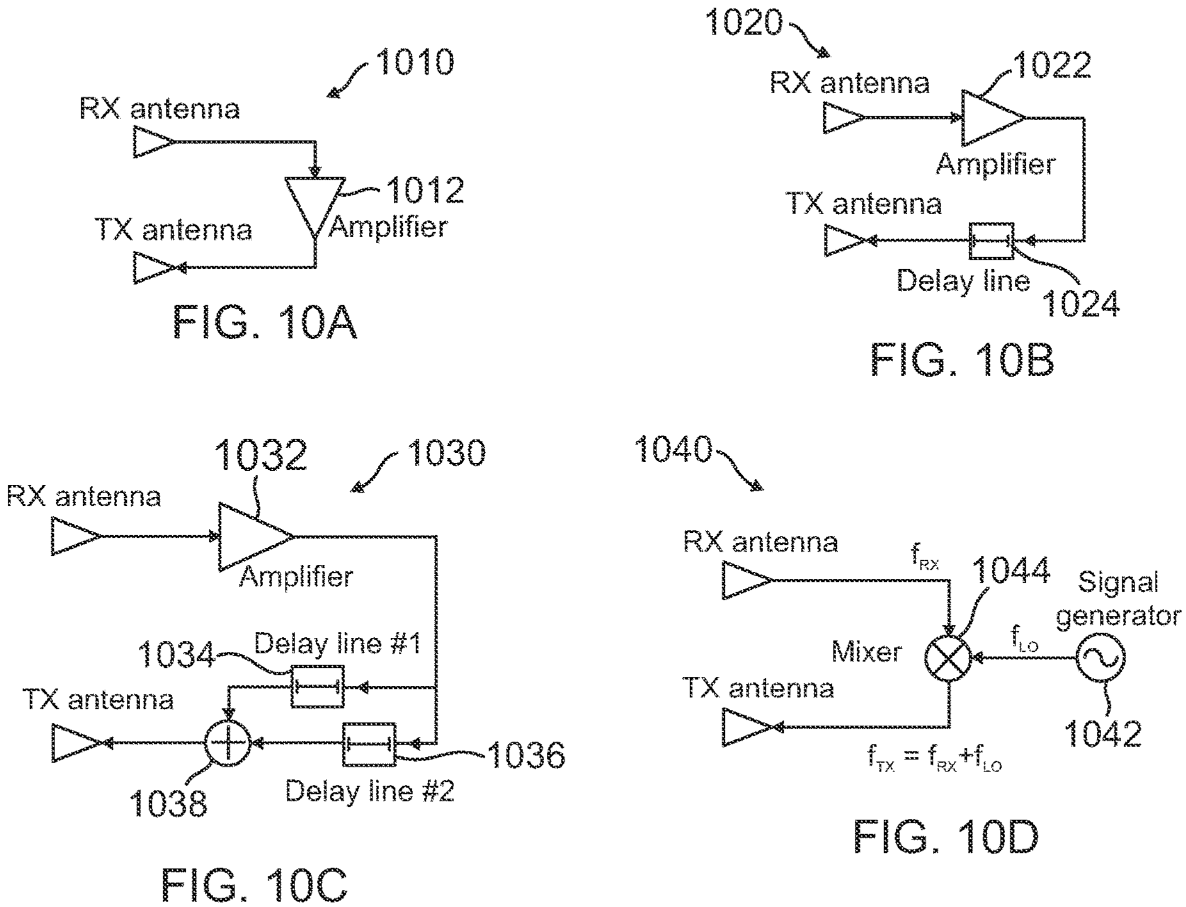
FIG. 10A
FIG. 10B
FIG. 10C
FIG. 10D
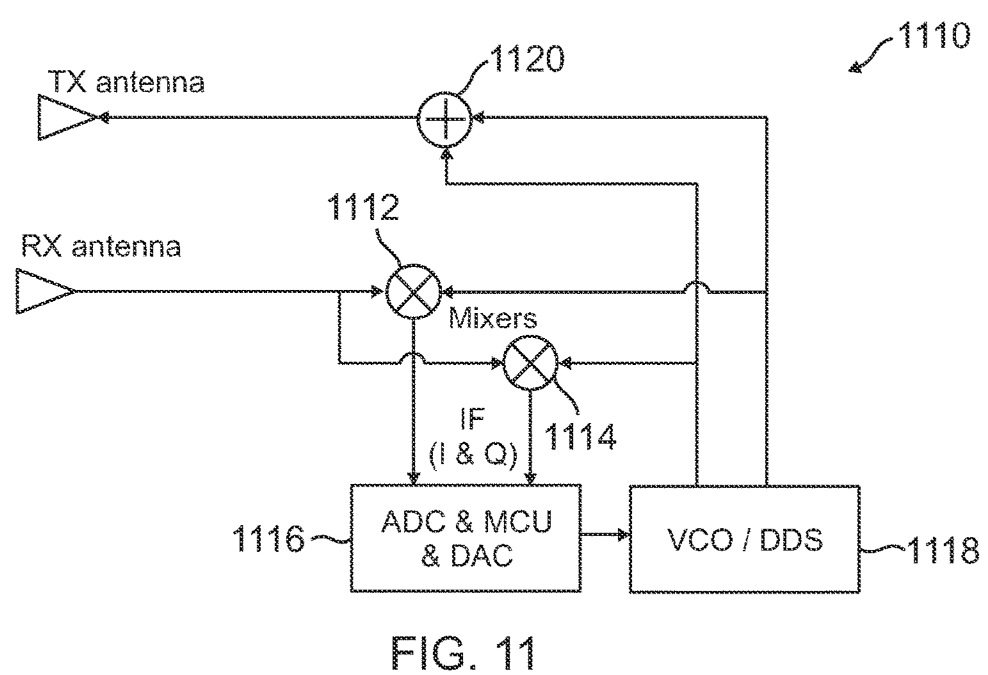
FIG. 11

LANDING NAVIGATION BASED ON RADAR ALTIMETER AND MULTI-ECHOES RF BEACONS

CROSS REFERENCE TO RELATED APPLICATION

This application claims the benefit of and priority to U.S. Provisional Application No. 63/510,973, filed on Jun. 29, 2023, the disclosure of which is herein incorporated by reference.

BACKGROUND

Navigation is one of the key components for autonomous air vehicle operations. In addition, for vertical take-off and landing (VTOL) aircraft, the landing phase is the most critical phase of VTOL autonomous flight, especially in terms of navigation accuracy and integrity. A navigation solution for this landing phase assumes hybridization of various sensors and systems to create an overall solution that meets stringent navigation requirements. Examples of such sensors and systems include inertial sensors, an inertial navigation system (INS), global navigation satellite system (GNSS) sensors, barometers, and radar altimeters, which are used to determine the horizontal and vertical positions of the aircraft.

A problem for systems on such aircraft is to satisfy navigation requirements in GNSS-denied conditions. Unfortunately, a conventional radar altimeter such as used for the landing phase provides only vertical position information. While multilateration to point-like ground reflective objects can extend radar altimeter capabilities, there are certain limitations.

For example, utilization of passive radar reflectors has been considered to support VTOL operations. However, placement of the passive radar reflectors is not a trivial task. Even if the radar has the ability to provide accurate angular information (e.g., using monopulse or multiple-input multiple-output (MIMO) techniques), it is demanding to distinguish between targets at the same range (within the same sensor range bin) due to sidelobes or wide antenna beamwidth. In addition, clear identification of individual reflectors is essential for a reliable navigation solution providing information with sufficient integrity. Moreover, the reflectors need to be installed both close to a helipad or vertiport center (due to radar beamwidth) and above ground (to be at different ranges other than ground). This makes the installation extremely time consuming and complicated.

SUMMARY

A method comprises providing a radar sensor unit onboard a vehicle, and one or more active radar beacons around a landing site. Each active radar beacon produces a pattern of one or more artificial echoes that is different from a pattern of one or more artificial echoes produced by others of the one or more active radar beacons. The method further includes guiding the vehicle toward the landing site by a process comprising transmitting radar signals from the radar sensor unit to an area around the landing site; receiving return signals in the radar sensor unit from the area around the landing site, the return signals including ground reflected signals, and transmitted signals from the one or more active radar beacons; and determining whether artificial echoes are detected in the received return signals. When artificial echoes are detected, the process further comprises loading parameters of the one or more active radar beacons for the landing site from an onboard active beacons database; identifying one or more patterns in the detected artificial echoes; associating the identified one or more patterns with a corresponding one or more of the active radar beacons from the active beacons database; and estimating a slant range to each of the one or more active radar beacons through the identified patterns in the detected artificial echoes.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIGS. 10A-10D are schematic diagrams of active radar beacons, according to various example embodiments;

FIG. 11 is a schematic diagram of an active radar beacon, according to another example embodiment.

DETAILED DESCRIPTION

Figures 1, 2:
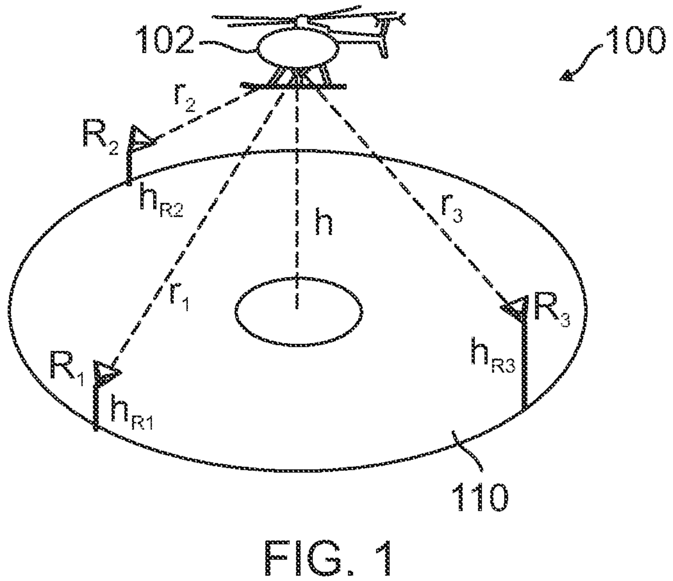
FIG. 1 illustrates a VTOL operation with passive radar reflectors, according to one example.
FIG. 2 illustrates a VTOL operation with active radar beacons, according to one implementation.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system for landing navigation based on radar sensor and multi-echoes radio frequency (RF) beacons are described herein.

The present method and system can utilize active radar RF beacons, together with a radar sensor such as a radar altimeter, for landing operations of various aircraft. Examples of such aircraft include VTOL vehicles, such as helicopters, uncrewed aerial vehicles (UAVs), urban air mobility (UAM) vehicles, or the like. In addition, the present method and system can be applicable to other types of aircraft, and to various approach/landing paths. In some examples, instead of a radar altimeter, which may be already on-board, other radar sensors measuring range may be used as well. These examples include, but are not limited to, scanning radars, mechanically scanning radars, electronically scanning radars, radars using MIMO processing, or the like. In addition, the present approach is applicable to various radar installations, such as downward looking radar sensors, forward looking radar sensors, side looking radar sensors, or the like.

A pattern of artificial ranges (or echoes), created using active transponders on ground, enables an onboard navigation system to determine not only vertical position but horizontal position, and supports navigation integrity using conventional radar altimeter hardware with improved software functionality. The present approach provides additional alternative sources of horizontal and vertical positions, which can improve the performance of current navigation solutions, or substitute, for example, for GNSS sources of information in the navigation system.

The artificial echoes can be produced by an active radar beacon to support beacon identification. A range to the artificial echo includes a range to the active radar beacon (which changes) and an artificially created range shift (which is constant). The artificial range shifts (unlike true ranges) remain constant during vehicle descent, thus making a beacon easier to identify.

The present approach allows for the creation of unique patterns of beacons (e.g., the patterns can be unique for neighboring vertiports). In one embodiment, one or more active radar beacons can be implemented as signal repeaters around a landing site. The artificial ranges represent repeated signals that can be modified or not modified.

The present system can include two sub-systems, a ground sub-system and an onboard sub-system. The ground sub-system includes active RF beacons with known positions and can operate in a radar altimeter frequency band. The active RF beacons are configured to generate unique multi-echoes patterns for individual active beacons. The onboard sub-system can use a radar altimeter (e.g., a single antenna radar altimeter (SARA)) with extended embedded software capable of detecting extra echoes at further ranges from the active RF beacons. This onboard software is capable of identifying patterns in detected echoes and associates the echoes with patterns of the active RF beacons stored in an onboard database for that particular beacon location. The onboard software estimates slant ranges to active beacons through the detected multi-echoes patterns. Thereafter, the software estimates ownship three-dimensional (3D) position by multilateration of the estimated slant ranges to the active RF beacons and their known positions, as well as using other sensor measurements on the vehicle.

The present method can estimate air vehicle 3D positions in various reference frames for use in generating a navigation solution for the vehicle. Examples of reference frames include a North East Down (NED) frame, a local landing zone frame, a vertiport frame, or the like, A radar sensor onboard an ownship/platform can be an ordinary radar altimeter or any radar sensor capable of the following functionality. Additional processing can be implemented to obtain more detections (beyond the traditional range to ground), to match these detections with active RF beacons, and to calculate ownship 3D position. This additional processing can be software modifications or extensions of a standard radar altimeter (e.g., SARA). In other words, additional functionality can be fully integrated into the radar altimeter's processor. Processing of raw radar altimeter data can also be done by an onboard computational platform external to the radar altimeter. As such, additional functionality can be implemented in an onboard external computational platform for processing data from the radar altimeter. Alternatively, additional functionality can be split between the radar altimeter and the onboard external computational platform.

The present approach has the advantage of providing support of all-weather operations, compared to alternatives such as those based on Electro-Optical/Infra-Red (EO/IR) systems. The present methods also provide an extension of radar altimeter capability towards a fully 3D position solution together with RF beacons on the ground (e.g., on landing pads or vertiports). The present approach also allows for supporting multiple landing pads located at the same vertiport.

In addition, the present system can be implemented without the need for additional onboard sensors, and supports navigation integrity. Navigation integrity can be assured using a higher number of active RF beacons, receiver autonomous integrity monitoring (RAIM), solution separation, or other integrity techniques.

The present approach is applicable in general to both continuous-wave (CW) (including FMCW) and pulse radars. In addition, one or more passive targets or reflectors can be employed along with the active RF beacons. Further, the active RF beacons can rebroadcast a received signal without additional adjustment except amplification (thus creating a strong zero-ground reference "target").

In some implementations, the ground sub-system can be configured for activation only when a signal from the radar altimeter is detected. Beacon antennas with a narrow beamwidth can be used by the active RF beacons to limit the area where these beacons might interfere or increase noise level of the radar altimeter measurements.

Further, the present approach can be applied in general to different radars (besides a radar altimeter), operating in different frequency bands.

Further details of various embodiments are described hereafter and with reference to the drawings.

The nomenclature used herein and in the drawings is defined as follows:

$R_1$, $R_2$, $R_3$ passive targets/radar reflectors;

$h_{R1}$, $h_{R2}$, $h_{R3}$ installation height of reflectors $R_1$-$R_3$ (height above ground/helipad/vertiport);

h ownship/platform height above ground/helipad/vertiport;

$r_1$, $r_2$, $r_3$ Slant ranges between onboard radar and reflectors $R_1$, $R_2$, $R_3$; if the reflectors are active beacons, then the slant range is between the onboard radar and the active beacon's actual antenna location;

$R_{A1}$, $R_{A2}$, $R_{A3}$ active radar beacons (position of transmitter (TX) and receiver (RX) antenna(s));

$R_{A1\text{-}AP1}$ artificial position (artificial range echo) #1 created by active radar beacon $R_{A1}$;

$R_{A1\text{-}AP2}$ artificial position (artificial range echo) #2 created by active radar beacon $R_{A1}$;

$\Delta r_{3\text{-}AP1}$ artificial slant range shift #1 (first) created by active radar beacon $R_{A3}$;

$\Delta r_{3\text{-}AP2}$ artificial slant range shift #2 (second) created by active radar beacon $R_{A3}$.

FIG. 1 illustrates an example VTOL operation 100 for a vehicle 102 (e.g., helicopter, UAV, UAM vehicle, or the like), using passive radar reflectors $R_1$, $R_2$, $R_3$ that are positioned at a landing site 110. As shown, vehicle 102 is at a height h above landing site 110, and has respective slant ranges $r_1$, $r_2$, $r_3$ to the passive radar reflectors $R_1$, $R_2$, $R_3$. The passive radar reflectors $R_1$, $R_2$, $R_3$ have respective installation heights $h_{R1}$, $h_{R2}$, $h_{R3}$ above landing site 110.

FIG. 2 illustrates a VTOL operation 200 for a vehicle 202 (e.g., helicopter, UAV, UAM vehicle, or the like), using active radar beacons $R_{A1}$, $R_{A2}$, $R_{A3}$ that are positioned at a landing site 210, according to one implementation of the present approach. As shown, vehicle 202 is at a height h above landing site 210, and has respective slant ranges $r_1$, $r_2$ and $r_3$ to the active radar beacons $R_{A1}$, $R_{A2}$ and $R_{A3}$. The active radar beacon $R_{A1}$ creates an artificial position (artificial range echo) $R_{A1\text{-}AP1}$ with corresponding artificial slant range shift $\Delta r_{1\text{-}AP1}$. The active radar beacon $R_{A2}$ creates an artificial position $R_{A2\text{-}AP1}$ with corresponding artificial slant range shift $\Delta r_{2\text{-}AP1}$. The active radar beacon $R_{A3}$ creates an artificial position $R_{A3\text{-}AP1}$ with corresponding artificial slant range shift $\Delta r_{3\text{-}AP1}$.

The active radar beacons as shown in FIG. 2 can overcome the problems with range separation when only passive reflectors are used (such as shown in FIG. 1), by the shifting (e.g., the artificial slant range(s) might differ for each beacon) of the real distance between the radar and the beacon. In addition, the physical size of an active radar beacon can be inset during installation at a landing site surface and thereby prevent the creation of any obstacle within the landing zone.

Figure 3:
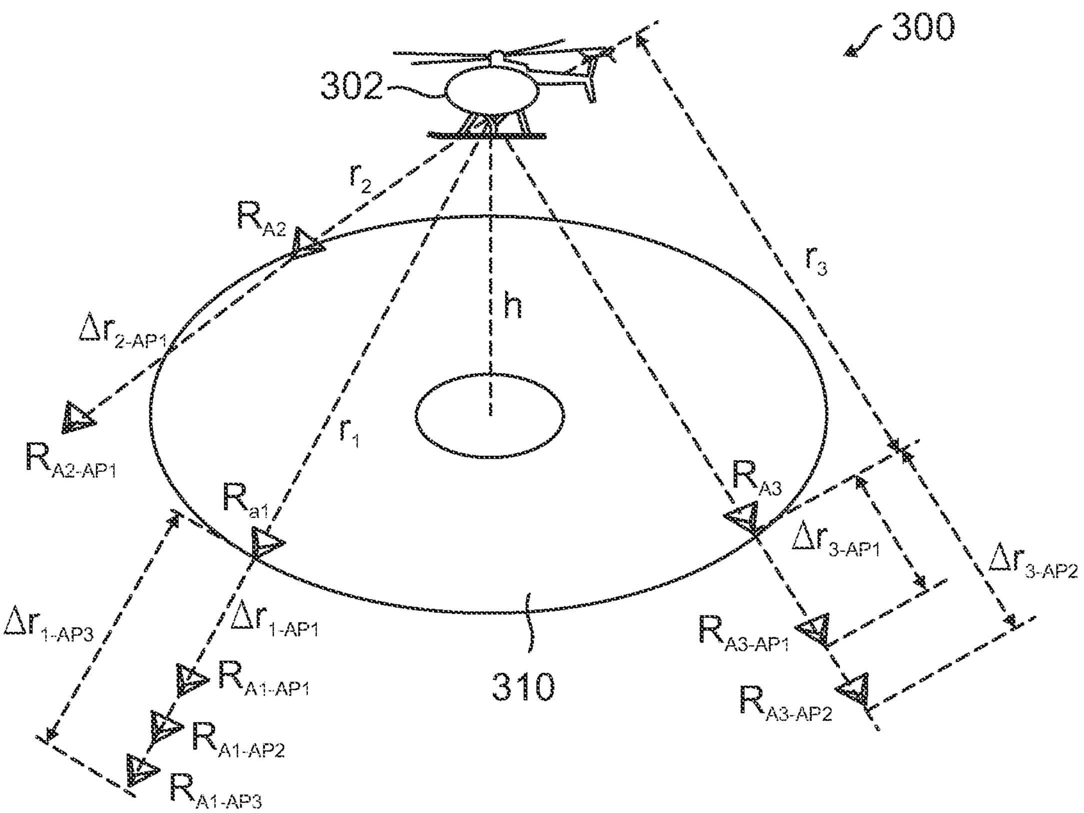
FIG. 3 illustrates a VTOL operation using active radar beacons with multiple artificial reflections, according to another implementation.

FIG. 3 illustrates a VTOL operation 300 for a vehicle 302 (e.g., helicopter, UAV, UAM vehicle, or the like), using active radar beacons $R_{A1}$, $R_{A2}$, $R_{A3}$ that are positioned at a landing site 310, according to another implementation of the present approach. As shown, vehicle 302 is at a height h above landing site 310, and has respective slant ranges $r_1$, $r_2$ and $r_3$ to the active radar beacons $R_{A1}$, $R_{A2}$ and $R_{A3}$. The active radar beacon $R_{A1}$ creates multiple artificial positions (artificial range echoes) $R_{A1\text{-}AP1}$, $R_{A1\text{-}AP2}$, $R_{A1\text{-}AP3}$, with corresponding artificial slant range shifts. For example, artificial position $R_{A1\text{-}AP1}$ has an artificial slant range shift $\Delta r_{1\text{-}AP1}$, and artificial position $R_{A1\text{-}AP3}$ has an artificial slant range shift $\Delta r_{1\text{-}AP3}$. The active radar beacon $R_{A2}$ creates an artificial position $R_{A2\text{-}AP1}$, with an artificial slant range shift $\Delta r_{2\text{-}AP1}$. The active radar beacon $R_{A3}$ creates multiple artificial positions $R_{A3\text{-}AP1}$, $R_{A3\text{-}AP2}$, with corresponding artificial slant range shifts $\Delta r_{3\text{-}AP1}$ and $\Delta r_{3\text{-}AP2}$.

FIG. 3 shows a scenario where each active radar beacon produces a different set of artificial slant ranges. The artificial slant ranges might differ for each beacon and the sets of slant ranges might differ for each installation/landing zone. This information creates a pattern and can be used to identify individual active beacons and landing zones.

Figure 4:
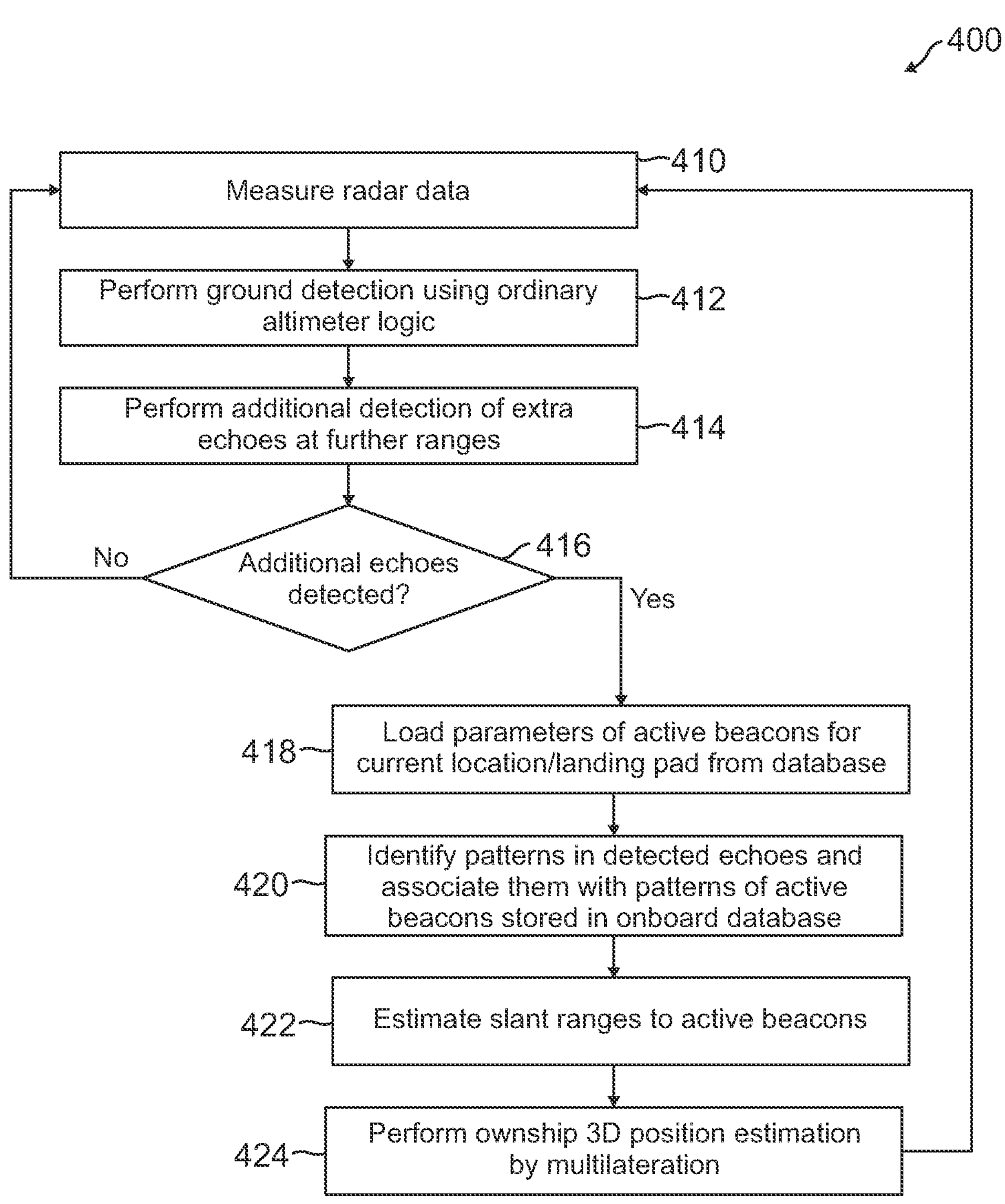
FIG. 4 is a flow diagram of onboard processing using a radar system with active radar beacons, according to one implementation.

FIG. 4 is a flow diagram of an onboard process 400 for using a radar system with one or more active radar beacons, according to one implementation. The process 400 starts by measuring radar data (block 410) from received return signals, including ground reflected signals and transmitted signals from the one or more active radar beacons, such as to form an FFT data profile. The process 400 also performs ground detection using ordinary altimeter logic (block 412). The process 400 then performs additional detection for any extra echoes at further ranges produced by the active radar beacons (block 414), and a determination is made whether additional echoes are detected (block 416). If not, then process 400 repeats starting at block 410.

If additional echoes are detected at block 416, then process 400 loads parameters of the one or more active radar beacons for a current location/landing zone from an onboard database (block 418). The process 400 identifies patterns in the detected echoes and associates these patterns with patterns of the active radar beacons stored in the onboard database (DB) (block 420). For example, the detected extra echoes can form multi-echoes patterns, which are identified and associated with patterns of active radar beacons stored in the onboard database for that particular location. The process 400 then estimates slant ranges to the active radar beacons (block 422). For example, slant ranges to individual active radar beacons can be estimated through one or more detected echoes. Finally, process 400 performs ownship 3D position estimation by multilateration of the estimated slant ranges to the active radar beacons and their known positions (block 424). The position can be estimated in various reference frames such as a NED frame, local landing zone frame, vertiport frame, or the like.

The slant ranges to the active radar beacons with their known positions can be used as navigation measurements in a vehicle navigation system, and can be used in combination with other navigation measurements from other vehicle sensors. In some examples, an angular orientation of a vehicle above the area around the landing zone can be determined based on received return signals from navigation sensors onboard the vehicle. It should be noted that at least one artificial echo per active beacon is needed for beacon identification and estimation of slant ranges.

The vehicle may utilize two or more sensors receiving the return signals from the beacons to partially or fully determine its 3D angular orientation. In some examples, the vehicle may use one or more sensors receiving the return signals from the beacons coupled with an inertial measurement unit to estimate the 3D angular orientation. In other examples, the vehicle may use one or more sensors receiving the return signals from the beacons with angle determination capability to estimate its 3D angular orientation.

Onboard Radar Systems and Active Radar Beacons

Figure 5:
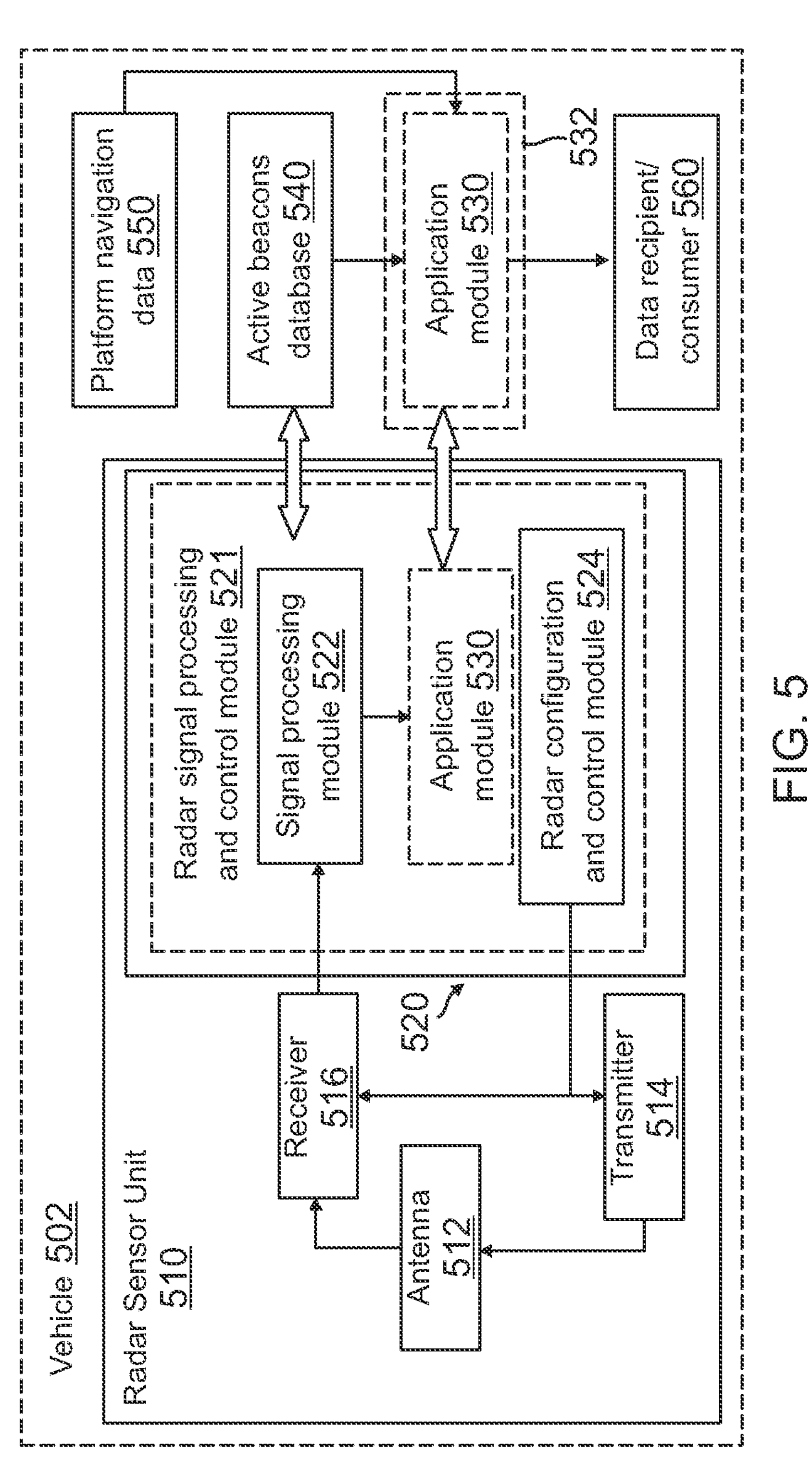
FIG. 5 is a block diagram of an onboard radar system configured to use active radar beacons, according to one embodiment.

FIG. 5 is a block diagram of an onboard radar system 500 configured for use with active radar beacons, according to one embodiment. The system 500 includes a radar sensor unit 510 onboard a vehicle 502 such as a VTOL vehicle. The radar sensor unit 510 generally comprises at least one antenna 512, a transmitter 514 operatively coupled to antenna 512, and a receiver 516 operatively coupled to antenna 512. The antenna 512 can be configured for transmitting radar signals or receiving return signals, such as an antenna array or the like. In addition, antenna 512 can be implemented with a beam steering capability, or with a fixed beam direction. In some embodiments, the receiver 516 and the transmitter 514 may each use their own dedicated antenna instead of antenna 512.

The radar sensor unit 510 also includes at least one processor unit 520 (e.g., a digital signal processor (DSP), a generic purpose processor (GPP), or the like), which includes a radar signal processing and control module 521 that is operative to perform radar signal/data processing and radar control. The radar signal processing and control module 521 hosts a signal processing module 522 configured to receive a signal from receiver 516 and to process the received signal. This signal processing can include filtering, thresholding, forming radar images, identification and tracking of targets, or the like. The signal processing module 522 can be configured to output raw radar data, radar detection signals, tracks, or any other radar output data. The radar signal processing and control module 521 also hosts a radar configuration and control module 524 operative to send a control signal to transmitter 514, receiver 516, or both, to control radar scanning and configuration. The radar signal processing and control module 521 can also host other control units (not depicted in FIG. 5) to provide overall radar functionality (e.g., radar waveform definition and control, etc.). The radar sensor unit 510 may be configured to operate in different frequency bands (e.g., C, X, K, Ku, Ka).

An onboard application module 530 is in operative communication with signal processing module 522. In one embodiment, application module 530 can be hosted on radar sensor unit 510, such as in the radar signal processing and control module 521. In another embodiment, application module 530 can be hosted on a computational platform 532 external to radar sensor unit 510 and onboard vehicle 502. Alternatively, application module 530 can be distributed to both radar sensor unit 510 and external computational platform 532. The application module 530 can include a radar altimeter application, a Doppler navigation application, a terrain aided navigation application, or other similar application.

An onboard active beacons database 540 can be hosted on radar sensor unit 510, such as in radar signal processing and control module 521, or can be hosted on a computational platform/storage external to radar sensor unit 510 onboard vehicle 502. Alternatively, active beacons database 540 can be distributed to both radar sensor unit 510 and the external computing platform/storage. The active beacons database 540 is configured to store patterns for the active radar beacons at a particular location.

The application module 530 has access to information from active beacons database 540, and to radar output data (e.g., raw data, altitude, detections, tracks, etc.) from signal processing module 522. The application module 530 can also have access to platform navigation data 550 from one or more other sensors, which may include position and attitude of the vehicle or, in some embodiments, information about the approached landing area.

The application module 530 includes program instructions for performing the onboard processing using signals from the active radar beacons, such as described above with respect to FIG. 4. For example, application module 530 can include program instructions for the following: detection of significant echoes (e.g., detection of ranges between radar sensor unit 510 and individual beacons, both active and passive); processing of active beacons database 540 (e.g., data extraction from database 540 using platform navigation data 550); identification of detected echoes (e.g., matching active radar beacons with radar detections); and computation of ownship 3D position estimates.

During operation, application module 530 processes radar data provided by signal processing module 522, using the information from active beacons database 540 and platform navigation data 550, if available.

An output signal from application module 530 can be sent to a data recipient/consumer 560, such as a display, indicator, or the like. In some embodiments, radar sensor unit 510 can determine a direction to the active radar beacons using further processing. The direction information can be provided as additional information for vehicle navigation. Additionally, radar sensor unit 510 can determine a Doppler velocity to the active radar beacons using further processing. The Doppler velocity can also be provided as additional information for vehicle navigation.

Figure 6:
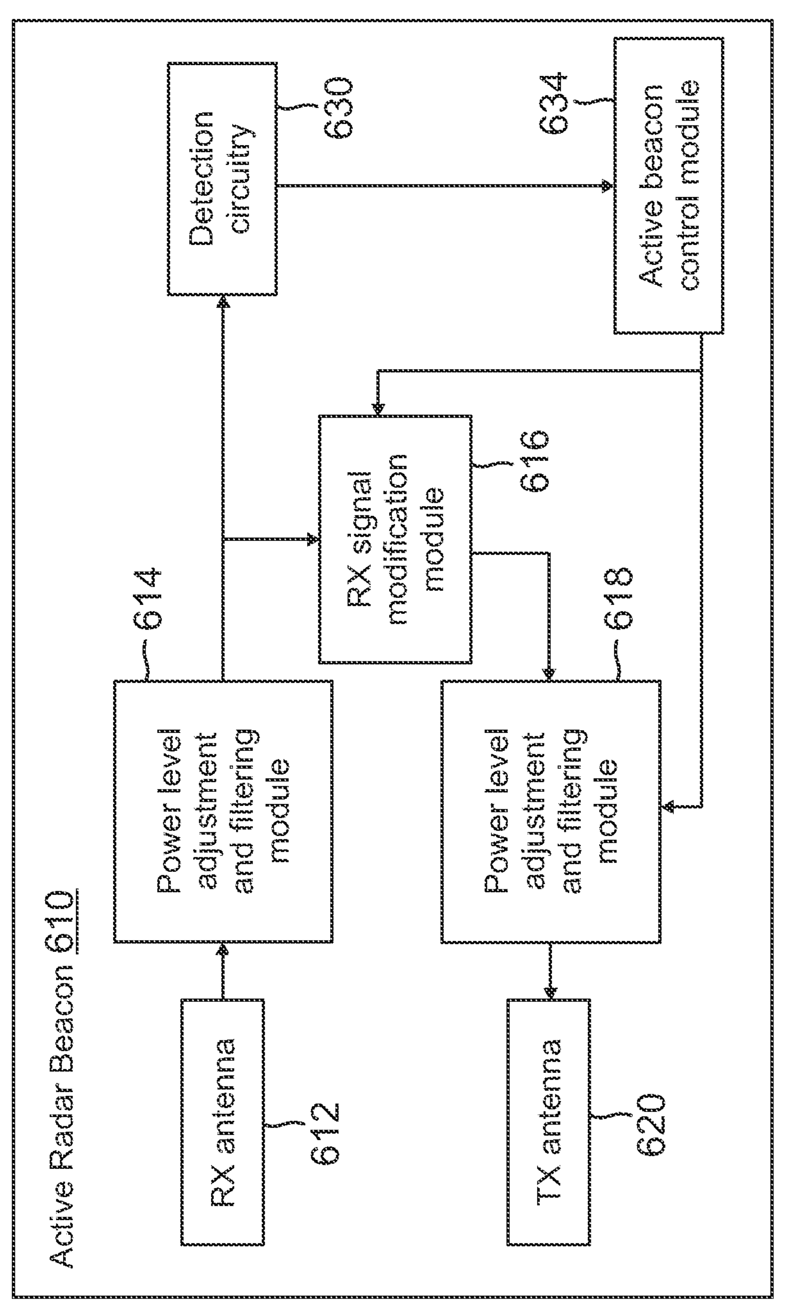
FIG. 6 is a block diagram of an active radar beacon, according to one embodiment.

FIG. 6 is a block diagram of an active radar beacon 610 for use at a landing site, according to one embodiment. The active radar beacon 610 includes a receiving (RX) antenna 612 configured to receive a radar signal from an onboard radar system, and a transmitting (TX) antenna 620 configured to send a modified signal back to the onboard radar system. The received radar signal can be amplified and filtered at a first power level adjustment and filtering module 614 (if needed). An RX signal modification module 616 is configured to perform signal adjustment, which can include signal amplification, signal delay, frequency shifting, or the like. Moreover, RX signal modification module 616 can also include parallel processing (e.g., signal delay by parallel delay lines). The modified signal from RX signal modification module 616 can be further amplified and filtered (if needed) at a second power level adjustment and filtering module 618. The modified signal is then transmitted back to the onboard radar system via TX antenna 620. Alternatively, active radar beacon 610 can use a single antenna for receiving and transmitting signals.

Optionally, active radar beacon 610 can include detection circuitry 630 (e.g., a simple power detector or more sophisticated conversion to the baseband) operative to receive the received radar signal, and an active beacon control module 634 operatively coupled to detection circuitry 630. Both detection circuitry 630 and active beacon control module 634 can be used to enable active radar beacon 610 to provide signals only if the incoming radar signal is received (e.g., active radar beacon 610 does not transmit without an active incoming radar signal), to control power and/or other parameters of the signal transmitted by active radar beacon 610. Further, additional RF components (e.g., circulators, isolators, attenuators, etc.) can be used as needed for a given active beacon implementation.

Figure 7:
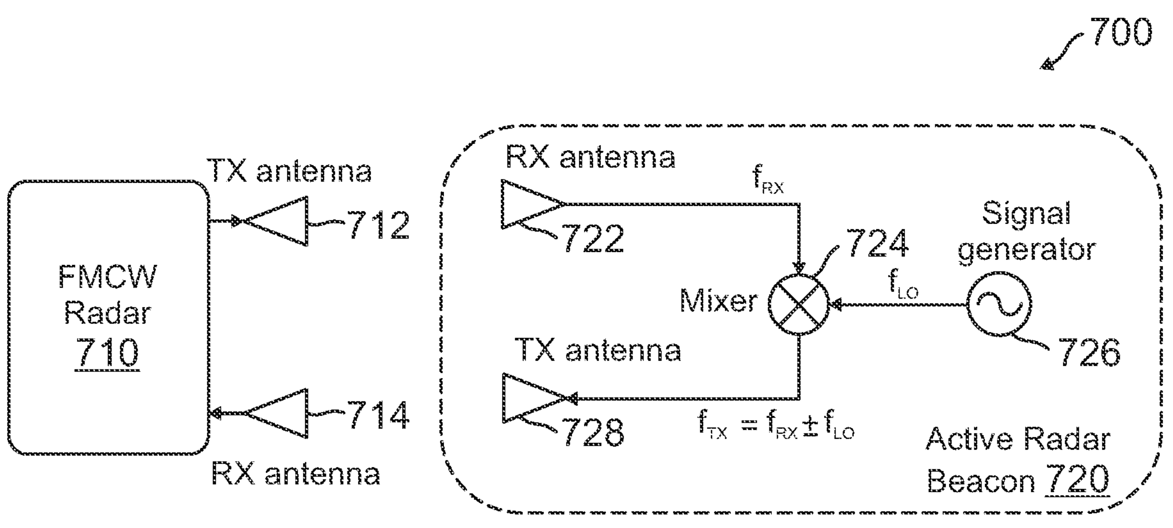
FIG. 7 is a schematic diagram of an active radar beacon that can be used for frequency-modulated continuous-wave (FMCW) radar, according to one embodiment.

FIG. 7 is a schematic diagram of a system 700 for using an onboard FMCW radar 710 with an active radar beacon 720, according to an example embodiment. The FMCW radar 710 includes a TX antenna 712 and a RX antenna 714. The active radar beacon 720 includes a RX antenna 722, which is coupled to a first input of a mixer 724. A signal generator 726 is coupled to a second input of mixer 724. A TX antenna 728 is coupled to an output of mixer 724.

During operation, a signal transmitted from TX antenna 712 of FMCW radar 710 is received by RX antenna 722 of active radar beacon 720. The received signal is modified by mixer 724, and is transmitted by TX antenna 728 to RX antenna 714 of FMCW radar 710. In this example, the received signal ($f_{RX}$) is frequency shifted based on a signal ($f_{LO}$) from signal generator 726. This frequency shift impacts the transmitted signal ($f_{TX}$) received by FMCW radar 710. In alternative embodiments, either or both the FMCW radar 710 and active radar beacon 720 may have a single antenna instead of the separate TX and RX antennas shown in FIG. 7. Further, additional RF components (e.g., circulators, isolators, attenuators, etc.) can be used as needed for a given implementation.

Figure 8:
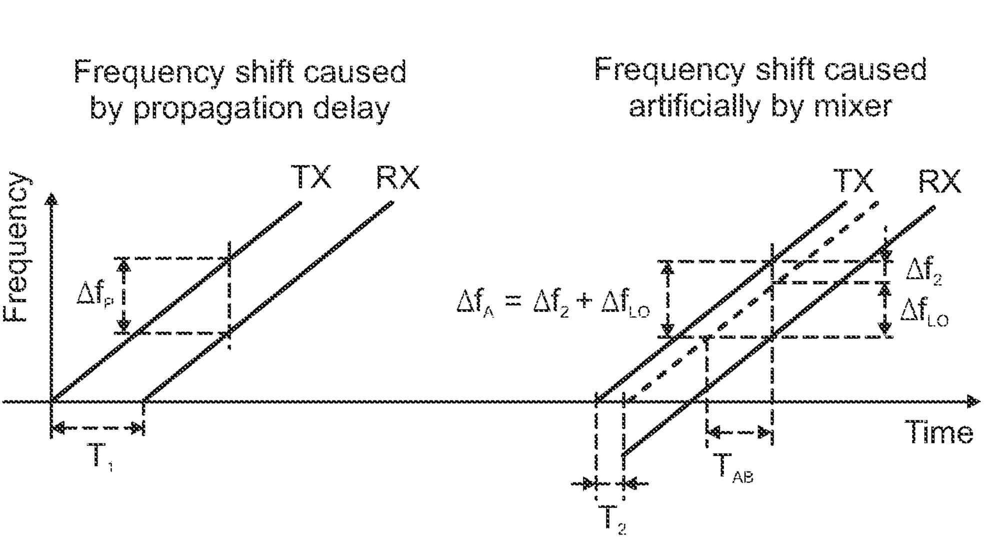
FIG. 8 is a graphical representation of exemplary FMCW signals received from passive targets and active radar beacons.

FIG. 8 is a graphical representation 800 of exemplary FMCW signals received from a passive target and an active radar beacon. In the case of the passive target, the signal propagation delay $T_1$ (between the radar and the passive target) causes a frequency shift ($\Delta f_P$) between transmitted and received signals. In the case of the active radar beacon, the frequency shift ($\Delta f_A = \Delta f_2 + \Delta f_{LO}$) is added artificially using a mixer, for example. The total time delay comprises a propagation delay $T_2$ (between the radar and the active radar beacon; resulting in frequency shift $\Delta f_2$) and an additional delay TAB (corresponding to frequency shift $\Delta f_{LO}$) caused by the active radar beacon (e.g., due to a cable between TX antenna, mixer, and RX antenna).

Figure 9:
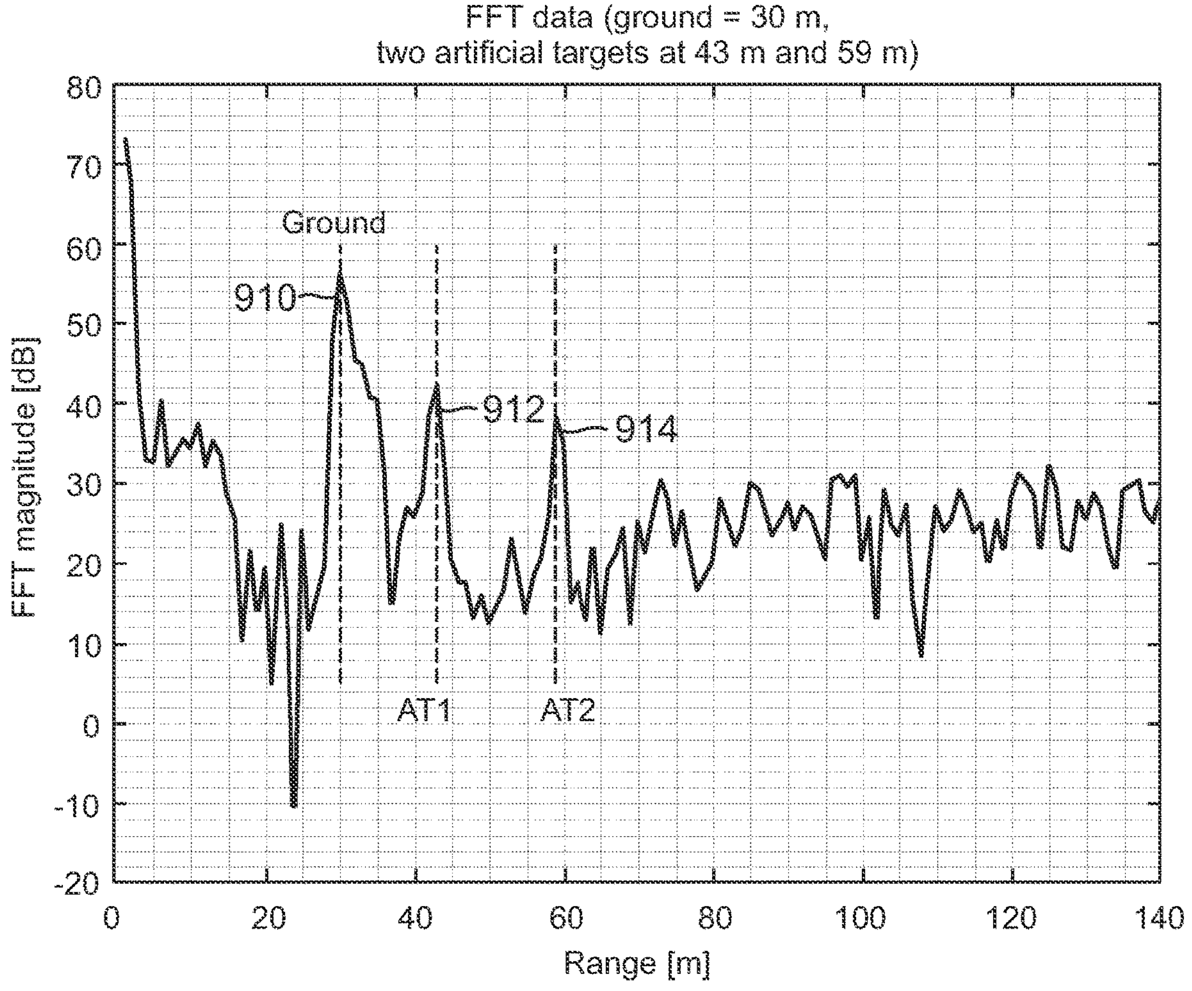
FIG. 9 is a graph of example radar fast Fourier transform (FFT) data, including ground clutter and two artificial echoes.

FIG. 9 is a graph of example radar FFT data from a radar altimeter, including a ground clutter peak 910 (at 30 m) and two artificially created echoes (targets) 912 and 914 (AT1 and AT2), which are respectively at 43 m and 59 m. Both of the artificial echoes were created with a positive slant range shift and thus, the signal indicates that the targets appear to be below ground (i.e., the target range is longer than the actual range to the ground).

Examples of Active Radar Beacons

An active beacon implementation can be done in multiple different ways. For example, the active beacon can use separate receiving and transmitting antennas; a single antenna; signal retransmission only (including signal amplification); retransmission of delayed (and amplified) signal; and transmission of modified received signal (e.g., signal modification might be implemented in RF domain, intermediate (IF) domain, or in baseband).

FIGS. 10A-10D are schematic diagrams of active radar beacons, according to various example embodiments.

FIG. 10A depicts an active radar beacon 1010 configured for transmitting an amplified received signal, such as through an amplifier 1012, which is coupled between a RX antenna and a TX antenna. FIG. 10B depicts an active radar beacon 1020 configured for transmitting an amplified and delayed received signal. For example, active radar beacon 1020 can be implemented using an amplifier 1022 coupled between an RX antenna and a RF cable, which has a length selected for a delay of a delay line 1024 that is coupled to a TX antenna.

FIG. 10C depicts an active radar beacon 1030 configured for transmitting an amplified and multiple times delayed received signal, using delay lines. For example, active radar beacon 1030 can be implemented using an amplifier 1032 coupled between an RX antenna and a pair of delay lines 1034, 1036, which are coupled to an output adder 1038 that is coupled to a TX antenna.

FIG. 10D depicts an active radar beacon 1040 configured for transmitting a received radar signal with a modified frequency, using a signal generator 1042 coupled to a mixer 1044, which is coupled between a RX antenna and a TX antenna. If needed, active radar beacon 1030 can be implemented using an amplifier coupled between the RX antenna and the TX antenna.

It should be noted that the active radar beacon implementation needs to comply with the radar type. For example, modifying the signal frequency such as shown in FIG. 10D for active radar beacon 1040 will work only with FMCW radars (see FIG. 7). However, introducing a signal delay such as shown in FIG. 10B will work with all radar types using various signal modulations.

More sophisticated active radar beacons can be implemented to receive and analyze the radar signal. FIG. 11 is a schematic diagram of an active radar beacon 1110 according to such an implementation. The active radar beacon 1110 is configured for analyzing the radar signal and transmitting an artificial response signal. The artificial response signal transmitted back to the onboard radar system can be controlled to create not only artificial range, but even artificial velocity, for example, using mixers and various digital signal processing (DSP) components. For example, active radar beacon 1110 can be implemented using a pair of input mixers 1112, 1114 coupled between a RX antenna and DSP components 1116 (e.g., analog to digital converter (ADC), microcontroller unit (MCU), digital to analog converter (DAC)). An output of DSP components 1116 is coupled to a signal generating component 1118 (e.g., voltage-controlled oscillator (VCO), direct digital synthesis (DDS)). An output of signal generating component 1118 is coupled to mixers 1112, 1114 in a feedback loop, and to an output adder 1120, which is coupled to a TX antenna.

Navigation Using Multilateration Beacons

The following example method illustrates how vehicle navigation can be performed using multilateration positioning (i.e., pseudo-range multilateration) by processing slant ranges from multilateration beacons. This example method can estimate air vehicle 3D positions in various reference frames for use in generating a navigation solution for a vehicle.

Figure 12:
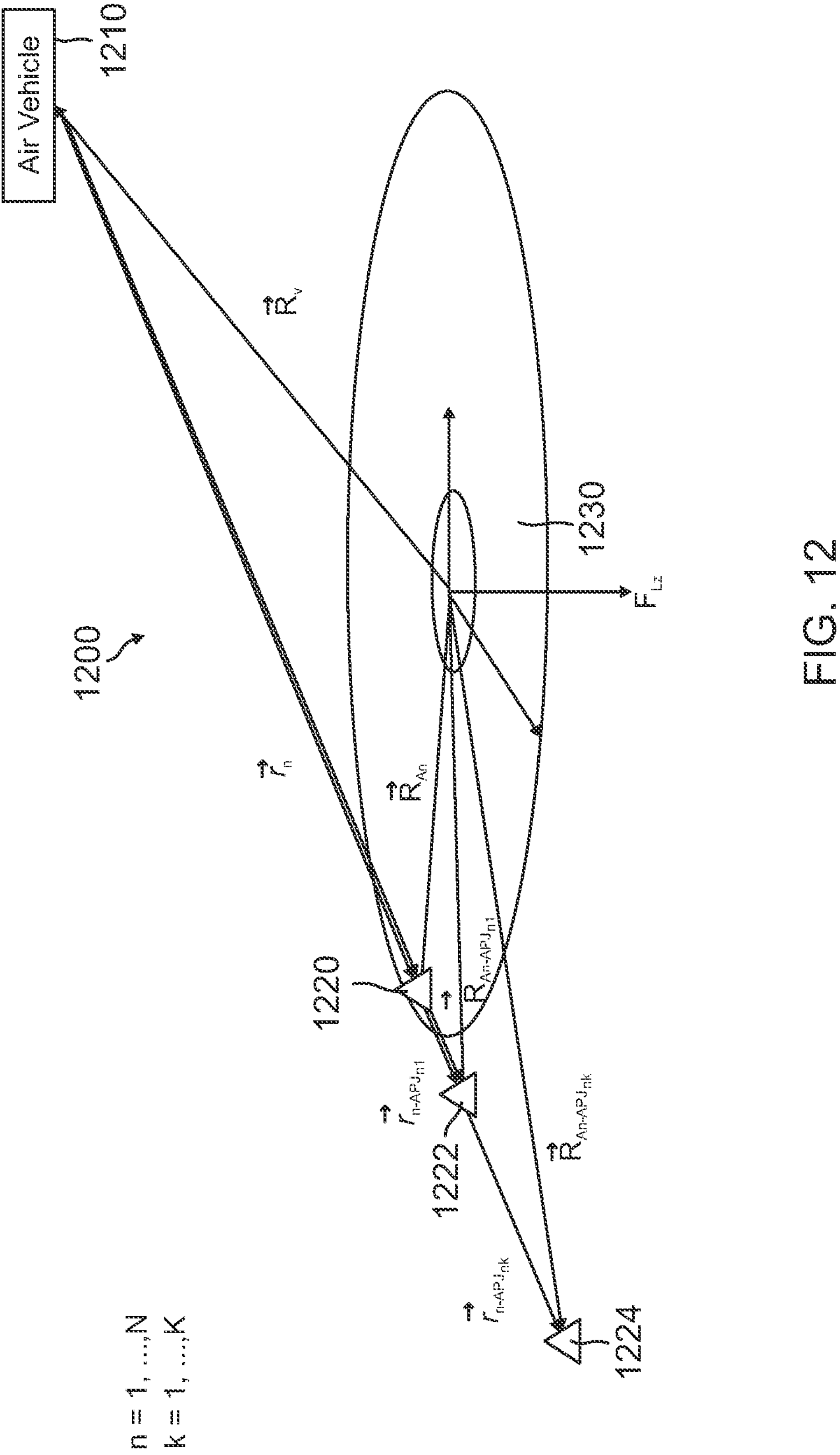
FIG. 12 is a schematic diagram of an exemplary vehicle navigation method using at least one multilateration beacon.

FIG. 12 is a schematic diagram illustrating a vehicle navigation technique 1200, in which the example method can be employed. An air vehicle 1210 is in communication with at least one multilateration beacon 1220, which is positioned at a landing zone 1230. The multilateration beacon 1220 creates artificial positions 1222 and 1224, with corresponding artificial slant range shifts. The example method and vehicle navigation technique 1200 employ various equations and include the following parameters:

$F_{Lz}$≡reference frame, landing zone;

m≡measurement;

N≡number of beacons;

$J_{nK}$≡number of artificial positions for beacon n;

$\widehat{(*)}$ ≡estimate;

$\|*\|$≡norm;

$\vec{R}_v$≡vehicle position vector;

$$R_v^{Lz} = \begin{bmatrix} x_v \\ y_v \\ z_v \end{bmatrix} \equiv \text{vehicle position resolved in } F_{Lz};$$

$\vec{R}_{An}$≡beacon position vector;

$$R_*^{Lz} = \begin{bmatrix} x_* \\ y_* \\ z_* \end{bmatrix} \equiv \text{known beacon position resolved in } F_{Lz};$$

$\vec{r}_n$≡slant range vector;

$\vec{r}_{n\text{-}APJ_{n1}}$≡first artificial slant range vector for beacon n;

$\vec{r}_{n\text{-}APJ_{nK}}$≡kth artificial slant range vector for beacon n;

$\vec{R}_{An\text{-}APJ_{n1}}$≡first artificial position vector for beacon n;

$\vec{R}_{An\text{-}APJ_{nK}}$≡kth artificial position vector for beacon n.

In the example method, the slant range equations for each beacon n, such as multilateration beacon 1220, are as follows:

$$\|\vec{r}_n\| = r_n = \left[(x_v - x_n)^2 + (y_v - y_n)^2 + (z_v - z_n)^2\right]^{1/2};$$

$$\|\vec{r}_{n-APJ_{n1}}\| = r_{n-APJ_{n1}} = \left[\left(x_v - x_{n-APJ_{n1}}\right)^2 + \left(y_v - y_{n-APJ_{n1}}\right)^2 + \left(z_v - z_{n-APJ_{n1}}\right)^2\right]^{1/2};$$

$$\vdots$$

$$\|\vec{r}_{n-APJ_{nK}}\| = r_{n-APJ_{nK}} = \left[\left(x_v - x_{n-APJ_{nK}}\right)^2 + \left(y_v - y_{n-APJ_{nK}}\right)^2 + \left(z_v - z_{n-APJ_{nK}}\right)^2\right]^{1/2}.$$

In the example method, the general linearized range equation for each range measurement follows:

$$\delta r_* = \frac{\partial r_*}{\partial x_v}\delta x_v + \frac{\partial r_*}{\partial y_v}\delta y_v + \frac{\partial r_*}{\partial z_v}\delta z_v = \begin{bmatrix}\frac{\partial r_*}{\partial x_v} & \frac{\partial r_*}{\partial y_v} & \frac{\partial r_*}{\partial z_v}\end{bmatrix}\begin{bmatrix}\delta x_v \\ \delta y_v \\ \delta z_v\end{bmatrix} = \begin{bmatrix}\frac{\partial r_*}{\partial x_v} & \frac{\partial r_*}{\partial y_v} & \frac{\partial r_*}{\partial z_v}\end{bmatrix}\delta R_v$$

$$\frac{\partial r_*}{\partial x_v} = \frac{x_v - x_*}{r_*}$$

$$\frac{\partial r_*}{\partial y_v} = \frac{y_v - y_*}{r_*}$$

$$\frac{\partial r_*}{\partial z_v} = \frac{z_v - z_*}{r_*}$$

In the example method, the geometry matrix, $H_n$, for each beacon n follows:

$$\delta r_n = \begin{bmatrix}\frac{\partial r_n}{\partial x_v} & \frac{\partial r_n}{\partial y_v} & \frac{\partial r_n}{\partial z_v}\end{bmatrix}\delta R_v$$

$$\delta r_{n-APJ_{n1}} = \begin{bmatrix}\frac{\partial r_{n-APJ_{n1}}}{\partial x_v} & \frac{\partial r_{n-APJ_{n1}}}{\partial y_v} & \frac{\partial r_{n-APJ_{n1}}}{\partial z_v}\end{bmatrix}\delta R_v$$

$$\vdots$$

$$\delta r_{n-APJ_{nK}} = \begin{bmatrix}\frac{\partial r_{n-APJ_{nK}}}{\partial x_v} & \frac{\partial r_{n-APJ_{nK}}}{\partial y_v} & \frac{\partial r_{n-APJ_{nK}}}{\partial z_v}\end{bmatrix}\delta R_v$$

$$\begin{bmatrix}\delta r_n \\ \delta r_{n-APJ_{n1}} \\ \vdots \\ \delta r_{n-APJ_{nK}}\end{bmatrix} = \begin{bmatrix}\frac{\partial r_n}{\partial x_v} & \frac{\partial r_n}{\partial y_v} & \frac{\partial r_n}{\partial z_v} \\ \frac{\partial r_{n-APJ_{n1}}}{\partial x_v} & \frac{\partial r_{n-APJ_{n1}}}{\partial y_v} & \frac{\partial r_{n-APJ_{n1}}}{\partial z_v} \\ \vdots & \vdots & \vdots \\ \frac{\partial r_{n-APJ_{nK}}}{\partial x_v} & \frac{\partial r_{n-APJ_{nK}}}{\partial y_v} & \frac{\partial r_{n-APJ_{nK}}}{\partial z_v}\end{bmatrix}\delta R_v = H_n \delta R_v$$

The example method can be used to compute a vehicle navigation solution, such as for air vehicle 1210, by the following steps. In a first step, the method receives measurements m from each beacon n, such as multilateration beacon 1220, at a current epoch. In a second step, the method provides an initial guess for the vehicle position resolved in the reference frame of the landing zone, such as landing zone 1230

$$\left(R_v^{Lz}: \hat{R}_v^{Lz}\right).$$

The source of the initial position guess $$\hat{R}_v^{Lz}$$

can be an onboard navigation system, a previous measurement epoch, or user-selected. In a third step, using the initial position guess $$\hat{R}_v^{Lz},$$

the method computes estimated ranges from air vehicle 1210 to each beacon n using the following equations:

$$\hat{r}_n = \left[(\hat{x}_v - x_n)^2 + (\hat{y}_v - y_n)^2 + (\hat{z}_v - z_n)^2\right]^{1/2};$$

$$\hat{r}_{n-APJ_{n1}} = \left[\left(\hat{x}_v - x_{n-APJ_{n1}}\right)^2 + \left(\hat{y}_v - y_{n-APJ_{n1}}\right)^2 + \left(\hat{z}_v - z_{n-APJ_{n1}}\right)^2\right]^{1/2}$$

$$\vdots$$

$$\hat{r}_{n-APJ_{nK}} = \left[\left(\hat{x}_v - x_{n-APJ_{nK}}\right)^2 + \left(\hat{y}_v - y_{n-APJ_{nK}}\right)^2 + \left(\hat{z}_v - z_{n-APJ_{nK}}\right)^2\right]^{1/2}.$$

In a fourth step, the method computes the estimated geometry matrix, $\hat{H}_n$, for each beacon n using the following equation:

$$\hat{H}_n = \begin{bmatrix}\frac{\partial \hat{r}_n}{\partial \hat{x}_v} & \frac{\partial \hat{r}_n}{\partial \hat{y}_v} & \frac{\partial \hat{r}_n}{\partial \hat{z}_v} \\ \frac{\partial \hat{r}_{n-APJ_{n1}}}{\partial \hat{x}_v} & \frac{\partial \hat{r}_{n-APJ_{n1}}}{\partial \hat{y}_v} & \frac{\partial \hat{r}_{n-APJ_{n1}}}{\partial \hat{z}_v} \\ \vdots & \vdots & \vdots \\ \frac{\partial \hat{r}_{n-APJ_{nK}}}{\partial \hat{x}_v} & \frac{\partial \hat{r}_{n-APJ_{nK}}}{\partial \hat{y}_v} & \frac{\partial \hat{r}_{n-APJ_{nK}}}{\partial \hat{z}_v}\end{bmatrix}$$

Next, in a fifth step, the method computes the error between the measured range and the estimated range for each beacon n as $\delta\hat{R}_n$ using the following equation:

$$\begin{bmatrix}\delta\hat{r}_n \\ \delta\hat{r}_{n-APJ_{n1}} \\ \vdots \\ \delta\hat{r}_{n-APJ_{nK}}\end{bmatrix} = \delta\hat{R}_n = \begin{bmatrix}r_{m,n} \\ r_{m,n-APJ_{n1}} \\ \vdots \\ r_{m,n-APJ_{nK}}\end{bmatrix} - \begin{bmatrix}\hat{r}_n \\ \hat{r}_{n-APJ_{n1}} \\ \vdots \\ \hat{r}_{n-APJ_{nK}}\end{bmatrix}$$

In a sixth step, the method computes the position error, $\delta R_v$, using each beacon, with the following equations:

$$\delta R_v = \begin{bmatrix}\hat{H}_1 \\ \vdots \\ \hat{H}_N\end{bmatrix}^{\dagger}\begin{bmatrix}\delta\hat{R}_1 \\ \vdots \\ \delta\hat{R}_N\end{bmatrix} = \hat{H}^{\dagger}\delta\hat{R}$$

$$\mathrm{Cov}(\delta R_v) = \hat{H}^{\dagger}\mathrm{Cov}(\delta\hat{R})\hat{H}^{\dagger T}$$

$$(\circ)^{\dagger} \equiv \text{pseudoinverse}$$

Thereafter, in a seventh step, the method updates the vehicle position estimate relative to $F_{Lz}$ as follows:

$$\hat{R}_{v,update}^{Lz} = \hat{R}_v^{Lz} + \delta R_v$$

Finally, in an eighth step, the method compares the position error, $\delta R_v$, against a user-selected threshold, $\varepsilon$. If $\|\delta R_v\| \le \varepsilon$, then an iteration of the method is complete, and the navigation solution is $$\hat{R}_{v,update}^{Lz}$$

with a covariance $\mathrm{Cov}(\delta R_v)$. If $\|\delta R_v\| > \varepsilon$, then the iteration is incomplete, and the iteration returns to the third step of the method, with $$\hat{R}^{Lz}_{v,update}$$

used as the position guess.

The processing units and/or other computational devices used in the method and system described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a method comprising: providing a radar sensor unit onboard a vehicle; providing one or more active radar beacons around a landing site, wherein each active radar beacon produces a pattern of one or more artificial echoes that is different from a pattern of one or more artificial echoes produced by others of the one or more active radar beacons; and guiding the vehicle toward the landing site by a process comprising: transmitting radar signals from the radar sensor unit to an area around the landing site; receiving return signals in the radar sensor unit from the area around the landing site, the return signals including ground reflected signals, and transmitted signals from the one or more active radar beacons; determining whether artificial echoes are detected in the received return signals; when artificial echoes are detected, loading parameters of the one or more active radar beacons for the landing site from an onboard active beacons database; identifying one or more patterns in the detected artificial echoes; associating the identified one or more patterns with a corresponding one or more of the active radar beacons from the active beacons database; and estimating a slant range to each of the one or more active radar beacons through the identified patterns in the detected artificial echoes.

Example 2 includes the method of Example 1, further comprising: providing the slant range to each of the one or more active radar beacons to an onboard navigation system for further processing.

Example 3 includes the method of Example 2, further comprising: estimating a three-dimensional (3D) position of the vehicle using the slant range to each of the one or more active radar beacons, and other navigation measurements from one or more other sensors onboard the vehicle.

Example 4 includes the method of any of Examples 1-3, wherein: the active radar beacons are implemented as signal repeaters; and the artificial echoes represent repeated signals that are modified.

Example 5 includes the method of any of Examples 1-4, further comprising: determining an altitude of the vehicle above the area around the landing site based on the received return signals.

Example 6 includes the method of any of Examples 1-5, further comprising: determining an angular orientation of the vehicle above the area around the landing site based on received return signals from one or more other sensors onboard the vehicle.

Example 7 includes the method of any of Examples 1-6, wherein the vehicle comprises a vertical take-off and landing (VTOL) aircraft, a helicopter, an uncrewed aerial vehicle (UAV), or an urban air mobility (UAM) vehicle.

Example 8 includes the method of any of Examples 1-7, wherein the radar sensor unit comprises a radar altimeter.

Example 9 includes the method of any of Examples 1-8, further comprising: determining a direction to the one or more active radar beacons by the radar sensor unit and further processing, as additional information for navigation.

Example 10 includes the method of any of Examples 1-9, further comprising: determining a Doppler velocity to the active radar beacon by the radar sensor unit and further processing, as additional information for navigation.

Example 11 includes a system comprising: a radar sensor unit onboard a vehicle, the radar sensor unit comprising: at least one antenna; a transmitter operatively coupled to the at least one antenna, the transmitter configured to transmit radar signals through the at least one antenna to an area around a landing site that includes one or more active radar beacons; a receiver operatively coupled to the at least one antenna, the receiver configured to receive return signals from the area around the landing site, the return signals including ground reflected signals, and transmitted signals from the one or more active radar beacons; and at least one processor unit, which includes a radar signal processing and control module that is operative to perform radar signal/data processing and radar control, wherein the radar signal processing and control module includes: a signal processing module configured to receive and process the received return signals from the receiver; and a radar configuration and control module operative to send control signals to the transmitter and the receiver to control radar scanning and configuration; an onboard application module in operative communication with the signal processing module; and an onboard active beacons database in operative communication with the application module, the active beacons database configured to store signal patterns for active radar beacons at particular locations; wherein the onboard application module includes program instructions for performing a process to aid in guiding the vehicle toward the landing site, the process comprising: determining whether artificial echoes are detected in the received return signals; when artificial echoes are detected, loading parameters of the one or more active radar beacons for the landing site from the active beacons database; identifying one or more patterns in the detected artificial echoes; associating the identified one or more patterns with a corresponding one or more of the active radar beacons from the active beacons database; estimating a slant range to each of the one or more active radar beacons through the identified patterns in the detected artificial echoes; and providing the slant range to each of the one or more active radar beacons to an onboard vehicle navigation system for further processing.

Example 12 includes the system of Example 11, wherein the application module is operative to access a position and attitude of the vehicle.

Example 13 includes the system of any of Examples 11-12, wherein the application module is hosted by the radar sensor unit, or is hosted by an onboard computational platform external to the radar sensor unit.

Example 14 includes the system of any of Examples 11-12, wherein the application module is distributed to both the radar sensor unit, and an onboard computational platform external to the radar sensor unit.

Example 15 includes the system of any of Examples 11-14, wherein the application module comprises a radar altimeter application, a Doppler navigation application, or a terrain aided navigation application.

Example 16 includes the system of any of Examples 11-15, wherein the active beacons database is hosted by the radar sensor unit, or is hosted by an onboard computational platform/storage external to the radar sensor unit.

Example 17 includes the system of any of Examples 11-15, wherein the active beacons database is distributed to both the radar sensor unit, and an onboard computational platform/storage external to the radar sensor unit.

Example 18 includes the system of any of Examples 11-17, wherein the vehicle comprises a vertical take-off and landing (VTOL) aircraft, a helicopter, an uncrewed aerial vehicle (UAV), or an urban air mobility (UAM) vehicle.

Example 19 includes the system of any of Examples 11-18, further comprising one or more active radar beacons that include: a receiving antenna configured to receive the radar signals from the radar sensor unit onboard the vehicle; a signal modification module in operative communication with the receiving antenna, the signal modification module configured to perform signal adjustment of the radar signals from the receiving antenna to produce modified signals; and a transmitting antenna in operative communication with the signal modification module, the transmitting antenna configured to transmit the modified signals to the radar sensor unit.

Example 20 includes the system of Example 19, further comprising: a first power level adjustment and filtering module operatively coupled between the receiving antenna and the signal modification module; a second power level adjustment and filtering module operatively coupled between the signal modification module and the transmitting antenna; detection circuitry operative to receive the radar signals from the first power level adjustment and filtering module; and an active beacon control module operatively coupled to the detection circuitry, the signal modification module, and the second power level adjustment and filtering module; wherein the detection circuitry and the active beacon control module are operative to activate the active radar beacon when incoming radar signals are received.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method comprising:

providing a radar sensor unit onboard a vehicle;

providing one or more active radar beacons around a landing site, wherein each active radar beacon produces a pattern of one or more artificial echoes that is different from a pattern of one or more artificial echoes produced by others of the one or more active radar beacons; and guiding the vehicle toward the landing site by a process comprising:

transmitting radar signals from the radar sensor unit to an area around the landing site;

receiving return signals in the radar sensor unit from the area around the landing site, the return signals including ground reflected signals, and transmitted signals from the one or more active radar beacons;

determining whether artificial echoes are detected in the received return signals;

when artificial echoes are detected, loading parameters of the one or more active radar beacons for the landing site from an onboard active beacons database;

identifying one or more patterns in the detected artificial echoes;

associating the identified one or more patterns with a corresponding one or more of the active radar beacons from the active beacons database; and estimating a slant range to each of the one or more active radar beacons through the identified patterns in the detected artificial echoes;

wherein the detected artificial echoes correspond to respective artificial range positions created by the one or more active radar beacons, the respective artificial range positions having corresponding artificial slant range shifts;

wherein the artificial slant range shifts remain substantially constant during operation regardless of a position of the vehicle.

2. The method of claim 1, further comprising:

providing the slant range to each of the one or more active radar beacons to an onboard navigation system for further processing.

3. The method of claim 2, further comprising:

estimating a three-dimensional (3D) position of the vehicle using the slant range to each of the one or more active radar beacons, and other navigation measurements from one or more other sensors onboard the vehicle.

4. The method of claim 1, wherein:

the active radar beacons are implemented as signal repeaters; and the artificial echoes represent repeated signals that are modified.

5. The method of claim 1, further comprising:

determining an altitude of the vehicle above the area around the landing site based on the received return signals.

6. The method of claim 1, further comprising:

determining an angular orientation of the vehicle above the area around the landing site based on received return signals from one or more other sensors onboard the vehicle.

7. The method of claim 1, wherein the vehicle comprises a vertical take-off and landing (VTOL) aircraft, a helicopter, an uncrewed aerial vehicle (UAV), or an urban air mobility (UAM) vehicle.

8. The method of claim 1, wherein the radar sensor unit comprises a radar altimeter.

9. The method of claim 1, further comprising:

determining a direction to the one or more active radar beacons by the radar sensor unit using an active electronically scanned array antenna and further processing, as additional information for navigation.

10. The method of claim 1, further comprising:

determining a Doppler velocity to the active radar beacon by the radar sensor unit and further processing, as additional information for navigation.

11. A system comprising:

a radar sensor unit onboard a vehicle, the radar sensor unit comprising:

at least one antenna;

a transmitter operatively coupled to the at least one antenna, the transmitter configured to transmit radar signals through the at least one antenna to an area around a landing site that includes one or more active radar beacons;

a receiver operatively coupled to the at least one antenna, the receiver configured to receive return signals from the area around the landing site, the return signals including ground reflected signals, and transmitted signals from the one or more active radar beacons; and at least one processor unit, which includes a radar signal processing and control module that is operative to perform radar signal/data processing and radar control, wherein the radar signal processing and control module includes:

a signal processing module configured to receive and process the received return signals from the receiver; and a radar configuration and control module operative to send control signals to the transmitter and the receiver to control radar scanning and configuration;

an onboard application module in operative communication with the signal processing module; and an onboard active beacons database in operative communication with the application module, the active beacons database configured to store signal patterns for active radar beacons at particular locations;

wherein the onboard application module includes program instructions for performing a process to aid in guiding the vehicle toward the landing site, the process comprising:

determining whether artificial echoes are detected in the received return signals;

when artificial echoes are detected, loading parameters of the one or more active radar beacons for the landing site from the active beacons database;

identifying one or more patterns in the detected artificial echoes;

associating the identified one or more patterns with a corresponding one or more of the active radar beacons from the active beacons database;

estimating a slant range to each of the one or more active radar beacons through the identified patterns in the detected artificial echoes; and providing the slant range to each of the one or more active radar beacons to an onboard vehicle navigation system for further processing;

wherein the detected artificial echoes correspond to respective artificial range positions created by the one or more active radar beacons, the respective artificial range positions having corresponding artificial slant range shifts;

wherein the artificial slant range shifts remain substantially constant during operation regardless of a position of the vehicle.

12. The system of claim 11, wherein the application module is operative to access a position and attitude of the vehicle.

13. The system of claim 11, wherein the application module is hosted by the radar sensor unit, or is hosted by an onboard computational platform external to the radar sensor unit.

14. The system of claim 11, wherein the application module is distributed to both the radar sensor unit, and an onboard computational platform external to the radar sensor unit.

15. The system of claim 11, wherein the application module comprises a radar altimeter application, a Doppler navigation application, or a terrain aided navigation application.

16. The system of claim 11, wherein the active beacons database is hosted by the radar sensor unit, or is hosted by an onboard computational platform/storage external to the radar sensor unit.

17. The system of claim 11, wherein the active beacons database is distributed to both the radar sensor unit, and an onboard computational platform/storage external to the radar sensor unit.

18. The system of claim 11, wherein the vehicle comprises a vertical take-off and landing (VTOL) aircraft, a helicopter, an uncrewed aerial vehicle (UAV), or an urban air mobility (UAM) vehicle.

19. The system of claim 11, further comprising one or more active radar beacons that include:

a receiving antenna configured to receive the radar signals from the radar sensor unit onboard the vehicle;

a signal modification module in operative communication with the receiving antenna, the signal modification module configured to perform signal adjustment of the radar signals from the receiving antenna to produce modified signals; and a transmitting antenna in operative communication with the signal modification module, the transmitting antenna configured to transmit the modified signals to the radar sensor unit.

20. The system of claim 19, further comprising:

a first power level adjustment and filtering module operatively coupled between the receiving antenna and the signal modification module;

a second power level adjustment and filtering module operatively coupled between the signal modification module and the transmitting antenna;

detection circuitry operative to receive the radar signals from the first power level adjustment and filtering module; and an active beacon control module operatively coupled to the detection circuitry, the signal modification module, and the second power level adjustment and filtering module;

wherein the detection circuitry and the active beacon control module are operative to activate the active radar beacon when incoming radar signals are received.

* * * * *